UNITED STATES PATENT OFFICE 2,408,814

TEMPORARY COATING

George Selden, Cincinnati, Ohio, assignor to Interchemical Corporation, New York, N. Y., a corporation of Ohio No Drawing. Application May 29, 1943, Serial No. 489,073

2 Claims. (Cl. 106—238)

This invention aims to provide a temporary camouflage coating for application to military vehicles (aircraft, tanks, and other motorized equipment) which shall be readily removable a short time after application when it is desired to restore the original appearance of the surface.

In the camouflaging of military equipment, particularly aircraft, it is often desirable to provide a coating to go over the original protective paint, to provide camouflage for a particular mission or missions. Such a coating should have a wide variety of properties, to meet a wide variety of conditions. To save shipping space, it should be available in a highly concentrated form, which will keep indefinitely under a wide variety of climatic conditions; the concentrated material should be readily convertible into a paint which can be stored for further use, and which can be applied by brush, spray, sponge, or whatever is available, by the use of water, gasoline, alcohol, turpentine and as wide a list of other solvents as may be available; the coating should dry rapidly; the coating after application should be versatile, so that it can be removed by simple hosing with water, or by solvent treatment, depending on what is available, without injury to the base paint or to the metal; and the coating should resist dew, rain, etc., during short periods of time.

Heretofore it has been possible to produce paints with some of the foregoing characteristics by the use of casein and similar protein binders. However, these coatings were subject to putrefaction, were not readily reducible with a variety of solvents, were damaged by freezing, were not suitable for application at temperatures substantially below 32° F., and were not readily removable even a compartively short time after application.

Other formulations to secure some of the desired properties will readily occur to those skilled in the art, but no means has heretofore been devised to secure all of the above characteristics simultaneously in a single coating.

I have discovered such a coating. It consists of a pigment, or a mixture of pigments to produce the desired color, dispersed in a vehicle which comprises rosin reacted with 65–75% of the theoretical quantity of monoethanolamine necessary to produce monoethanolamine hydroabietate, or hydroresinate (i. e. 65–75% of equimolecular portions).

The resin may be prepared by fusing the rosin and adding the monoethanolamine to the fused rosin, adding the amine at a relatively low temperature (circa 250° F.). The resin can then be dispersed in water, alcohol, gasoline, or the like, or it can be used dry for dispersing the pigment. Alternatively, the rosin may be dissolved in alcohol or gasoline, and the amine added to this solution at room temperature.

Paint may be made from the resin by malaxating pigment with the resin, using a mill, such as a two-roll mill or a Banbury mixer, sufficient heat being developed in the operation to produce a plastic consistency. The pigment-resin dispersion can be powdered and the powder can be dissolved on the job with water, gasoline, alcohol, or other solvents mentioned previously.

If a paste paint is desired, a concentrated solution of the resin can be made in such solvents as water, alcohol, or gasoline, and the pigment can be dispersed therein in the usual manner. I prefer to use alcohol to prepare the resin solution since it gives a non-freezing paste paint. The resultant paste can, in every case, be mixed with water, gasoline, or paint solvents.

Typical examples of the invention are the following:

Example 1.—Black powder paint

|  | Per cent |
|---|---|
| Resin | 28.60 |
| Carbon black (low color) | 4.70 |
| Whiting | 33.35 |
| Asbestine | 33.35 |
|  | 100.00 |

The resin is the reaction product of 893 pounds of rosin with 107 pounds of monoethanolamine. The rosin is melted, and the monoethanolamine is added at 250° F. The resin is cast, and broken up into relatively small pieces. The amount of amine used is 70% of the theoretical equivalent.

The above powder was made by grinding the pigment in the resin on a two-roll mill. After dispersion, the product was pulverized to pass through a 100 mesh screen.

Example 2.—Green powder paint

|  | Per cent |
|---|---|
| Resin of Example 1 | 28.60 |
| Chromium oxide | 17.90 |
| Asbestine | 53.50 |
|  | 100.00 |

This paint was made by grinding in a Banbury mill. The pigment-resin dispersion was broken up and pulverized to pass through a 100 mesh screen.

Example 3.—Regular black paste paint

|  | Per cent |
|---|---|
| Resin of Example 1 | 24.3 |
| Carbon black (low color) | 4.1 |
| Whiting | 28.3 |
| Asbestine | 28.3 |
| Solvent alcohol | 15.0 |
|  | 100.0 |

This paste paint was made by grinding on a three-roll mill after dissolving the resin in the alcohol.

White, red, and blue pastes were similarly made from the following ingredients:

Example 4.—White paste paint

|  | Per cent |
|---|---|
| Resin of Example 1 | 24.3 |
| Titanium dioxide | 60.7 |
| Solvent alcohol | 15.0 |
|  | 100.0 |

Example 5.—Red paste paint

|  | Per cent |
|---|---|
| Resin of Example 1 | 24.3 |
| Red iron oxide | 60.7 |
| Solvent alcohol | 15.0 |
|  | 100.0 |

Example 6.—Blue paste paint

|  | Per cent |
|---|---|
| Resin of Example 1 | 31.8 |
| Ultramarine blue | 53.2 |
| Solvent alcohol | 15.0 |
|  | 100.0 |

The paste paints of Examples 3 to 6 are preferably shipped to the point of use as simple colors, and may then be mixed with each other to produce intermediate colors. In general, they may be applied reduced with water, gasoline, or other solvents previously mentioned, as desired. It has been my experience that a reduction of 1 gallon of paste paint with about 3-4 gallons of water makes a good spreading paint. If gasoline or other organic solvents are used, about two or three gallons are necessary.

Where the powders of Examples 1 and 2 are employed, they may be dissolved in about equal weights of gasoline, and about 1½ times their weight of water. If desired, ammonia may be added with the water to improve their solubility. The ammonia, however, is not necessary. In order to insure complete dispersion in the case of the powder paints, it is desirable to soak the powder in a small percentage of the solvent, sufficient to make a paste, and then add the balance of the solvent to produce the ready-to-apply paint. This is, of course, the method in common use in preparing powder paints for application.

As previously noted, the resistance of this coating to removal by rain or water may be regulated. When the base is reduced for use with water or with the organic solvents listed, the resulting coating is rain-resistant, and is not removed by simple washing with water.

However, if the base is reduced for use with a dilute aqueous solution of a fixed alkali, or a dilute aqueous solution of a suitable detergent, the dried film then becomes freely water-soluble and consequently is subject to complete removal by rain or simple hosing with water.

The preferred detergent consists of an aqueous solution of silicates and phosphates of soda. The non-aqueous portion, not to exceed 5% of the solution, shall contain a minimum of 20% $SiO_2$, from 25% to 50% $Na_2O$, and from 10-30% $P_2O_5$. Such a detergent solution is exhibited in the following example:

|  | Pounds |
|---|---|
| Crystalline trisodium phosphate (dodecahydrate) | 4 |
| Sodium silicate (28.5% $SiO_2$, 8.7% $Na_2O$, 62.8% $H_2O$) | 2 |
| Water | 94 |
|  | 100 |

The detergent is preferred since it was found to be harmless in all concentrations to aluminum metal used in aircraft and to the usual permanent finishes encountered in this type of service, at temperatures not exceeding 140° F.

This detergent solution is also admirably suited to removal of the coating when the base is reduced for use with water or with the organic solvents mentioned.

My new paints have the following advantages which are so desirable in this type of paint:

The powder and paste are concentrated, and non-spoiling by air, cold or heat. They may be reduced with water, gasoline, and other commonly available solvents, to give smooth, easy-working paints which can be applied by spray, brush, sponge or by practically any other method, which paints dry in a period of time of the order of twenty minutes or less, and which can be similarly removed without damage to the permanent paint. With the proper detergent, they can be made into a water-removable paint which does not attack other paint over which it is applied, or the metal underneath.

Obviously, the examples can be multiplied indefinitely without departing from the scope of my invention, which is defined in the claims.

I claim:

1. A temporary powder paint characterized by its ready solubility, before and after application, in aqueous alkali, alcohol, gasoline, painter's naphtha, and similar solvents, and by resistance to atmospheric conditions for short periods of time, comprising a dispersion of pigment in the reaction product of rosin with 65%-75% of the molar equivalent of monoethanolamine required to form the rosin ester, the reaction product containing some free acid.

2. A temporary paint characterized by its ready removability with water comprising a concentrated paint, the major portion of which is pigment and the reaction product of rosin reacted with 65%-75% of the molar equivalent of monoethanolamine required to form the rosin ester, the reaction product containing some free acid, reduced to painting consistency with an aqueous detergent solution containing not in excess of 5% of sodium silicate and trisodium phosphate, of which at least 20% is $SiO_2$, from 25% to 50% is $Na_2O$, and from 10-30% is $P_2O_5$, the paint being further characterized by its inertness to oil paints, and to aluminum.

GEORGE SELDEN.